Patented Aug. 31, 1937

2,091,812

UNITED STATES PATENT OFFICE 2,091,812

ALKYL AND ALKOXY-ARYLAMINO ANTHRAQUINONE DYESTUFFS AND PROCESS FOR PREPARING THEM

Norman Hulton Haddock, Frank Lodge, and Colin Henry Lumsden, Manchester, England, assignors to Imperial Chemical Industries Limited, a corporation of Great Britain No Drawing. Application November 14, 1935, Serial No. 49,764. In Great Britain November 14, 1934

16 Claims. (Cl. 260—60)

This invention relates to new acid dyestuffs of the anthraquinone series.

It is an object of the invention to provide new acid dyestuffs of the anthraquinone series for wool and other animal fibres, the said dyestuffs giving shades which are especially fast to severe washing and milling and which do not need chroming. A further object is to produce new and valuable compounds of the anthraquinone series, and generally to advance the art.

Our new dyestuffs are of the type shown in the following general formula:

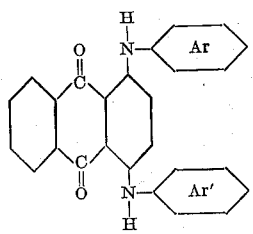

and carry one or more sulphonic acid groups. The benzene residues Ar and Ar' are characterized in that at least one of them carries as nuclear substituent an alkyl group having not less than 4 and not more than 7 carbon atoms, or an alkoxyl group having not less than 3 and not more than 9 carbon atoms. They may carry also other usual substituents such as halogen methyl, hydroxyl, amino or sulphonic groups.

Our new dyestuffs are prepared, according to the invention, by condensing a 1,4-dihalogenoanthraquinone or a leucoquinizarin body (under which term we include both leucoquinizarins and mixtures of leucoquinizarins with the corresponding quinizarins) with an arylamine of the benzene series carrying as nuclear substituent an alkyl or alkoxyl group as defined in the preceding paragraph.

Equally well the arylamine may be condensed with a 1-hydroxy-4-arylaminoanthraquinone or its leuco compound, i. e., a quinizarin or leucoquinizarin in which one hydroxyl has already been replaced by an anilino-, toluidino- or other arylamino group.

A sulphonic acid group may be introduced into the product, if it does not already contain sufficient solubilizing groups, by sulphonation (e. g. with sulphuric acid, oleum, chlorosulphonic acid or other sulphonating agent) or in suitable cases by replacement of a $\beta$-halogen atom by $SO_3H$ by interaction with a soluble sulphite.

The condensation with the arylamine may be effected in a solvent or diluent, which may be excess of the arylamine, or a neutral organic liquid such as cresol, or water. When using a leucoquinizarin it is preferable to add boric acid; and when using a 1,4-dihalogenoanthraquinone an acid absorber (such as alkali carbonates) and a copper catalyst are added with advantage.

The following examples, in which the parts are by weight, illustrate some specific embodiments of the invention.

Example 1

12 parts of leucoquinizarin, 18 parts of 4-aminobutylbenzene (Hickinbottom, J. Chem. Soc., 1930, 1565), 60 parts of cresylic acid and 6 parts of boric acid are stirred together at 100° C. for 48 hours. 90 parts of alcohol are added to facilitate further handling, the mixture is then cooled to 40° C. and filtered. The residue is washed with cold alcohol till nothing further is removed and then with hot water to remove boric acid.

The so-obtained product, 1,4-di-p-butylanilinoanthraquinone is crystallized from acetic acid. It is then a dark bronzy substance, soluble in benzene with a bright yellowish-green colour and in sulphuric acid with a reddish-blue colour.

For sulphonation, 5 parts of the compound are dissolved in 50 parts of 100% sulphuric acid at 20° C. and 20 parts of oleum (21% $SO_3$) are slowly added. The mixture is stirred at 25–30° C. for one half hour and then poured on to 180 parts of ice. When the ice has melted the mixture is filtered and the residue well pressed. It is then dissolved in hot water; the solution made first alkaline by adding caustic soda and the dyestuff salted out, pressed and dried. When ground it is a green powder dissolving in water to a bluish-green colour.

When 4-aminoisoamylbenzene or 4-aminoheptylbenzene (prepared by following the method described for 4-aminobutylbenzene loc. cit. but using iso amyl or heptyl alcohol, instead of butyl alcohol) is used instead of 4-aminobutylbenzene, the dyestuffs so obtained are similar in properties.

*Example 2*

1 part of the dyestuff from Example 1 is dissolved in 3000 parts of water containing 1.5 parts of 15% cetyl sodium sulphate paste. 50 parts of well-wetted yarn are entered, the dye-bath raised to the boil in half an hour and maintained at the boil for 1 hour. The dyed yarn is removed, rinsed in cold water and dried. The wool is dyed in green shades which are exceptionally fast to severe washing, milling and light, and are brighter than when no cetyl sodium sulphate is used.

*Example 3*

6 parts of leuco-1,4,5-trihydroxyanthraquinone, 10 parts of 4-aminobutylbenzene, 30 parts of cresylic acid and 5 parts of boric acid are stirred together at 130° C. for 20 hours. The mixture is cooled, and 50 parts of ethyl alcohol and 10 parts of caustic soda liquor (70° Tw.) are added and well mixed in. The product is filtered, washed with alcohol and then water and dried. It is a dark crystalline substance of M. P. 154° C. and dissolves in benzene with a bright yellowish-green colour. It appears to be 1-hydroxy-5,8-di-p-butylanilinoanthraquinone.

The dye powder obtained above is dissolved in 40 parts of 100% sulphuric acid at 25–30° C. and 20% oleum added in small quantities at a time until a test portion dissolves in cold water and the solution does not colour added benzene. The product is then poured into ice water, is filtered, and washed with saturated brine. The crude dyestuff is dissolved in hot water, made alkaline with caustic soda, and the sodium salt of the dyestuff precipitated with salt, filtered and washed with 10% brine.

The new dyestuff dyes wool in yellowish-green shades which are yellower than those of the corresponding dyestuff of Example 1. The dyeings are exceptionally fast to washing, alkaline milling and light.

Similar dyestuffs are obtained when 4-aminoisoamylbenzene or 4-aminoheptylbenzene is used instead of 4-aminobutylbenzene.

*Example 4*

5 parts of 1,4,5,8-tetrachloroanthraquinone, 40 parts of 4-aminobutylbenzene, 4 parts of potassium acetate, and 0.1 part of copper acetate crystals are heated together at 150–155° C. for 16 hours, cooled, diluted with an equal volume of alcohol, filtered, washed with alcohol and dried. The product 1,4-dichloro-5,8-di-p-butylanilinoanthraquinone forms light green crystals which dissolves in concentrated sulphuric acid with a blue colour.

The product is sulphonated as in Example 1. The resulting dyestuff, 1,4-dichloro-5,8-di-p-butylanilinoanthraquinonedi-sulphonic acid dyes wool in green shades which are very fast to severe washing and milling.

*Example 5*

40 parts of 1-p-toluidino-4-hydroxyanthraquinone and 10 parts of leuco-1-p-toluidino-4-hydroxyanthraquinone, 250 parts of 4-aminobutylbenzene and 50 parts of boric acid crystals are heated together at 180° C. for 18 hours. The greenish mixture is diluted with 750 parts of alcohol, then allowed to cool and stand for some hours. It is filtered and washed with alcohol, dilute caustic soda and warm water. After drying at 50° C., the product is crystallized from butanol when dark green crystals, melting point 129° C. are obtained.

When sulphonated as in Example 1 a green, water-soluble dyestuff is obtained which dyes wool in green shades of good fastness to severe washing and very good fastness to milling.

*Example 6*

8 parts of leucoquinizarin, 28 parts of quinizarin, 28 parts of boric acid crystals, 180 parts of cresylic acid and 54 parts of 4-aminobutylbenzene are heated at 150° C. for 2 hours. The mixture is cooled to 70° C., diluted with 200 parts of alcohol and 200 parts of 30% caustic soda solution, allowed to cool to 30° C., filtered, and washed with alcohol. The product is identical with that obtained in Example 1 using leucoquinizarin alone.

*Example 7*

10 parts of leucoquinizarin, 5 parts of crystalline boric acid and 40 parts of p-butoxyaniline are stirred at 100° C. for 17 hours. 100 parts of alcohol are added, the mixture cooled to 20° C. and filtered. The crystalline residue is washed with alcohol and hot water. It is dried at 100° C.

The so-obtained 1,4-di-p-butoxyanilinoanthraquinone is a dark blue crystalline substance of melting point 174° C. It dissolves in concentrated sulphuric acid with a blue colour.

10 parts of this product are dissolved in 0° C. in 60 parts of 98–99% sulphuric acid and 15 parts of oleum (25% $SO_3$) are added at 0° C. The solution is stirred for 5 minutes at 0° C., poured into 150 parts of ice water and filtered. The paste is dissolved in 400 parts of water at 70° C., neutralized with sodium carbonate, filtered, and the dyestuff salted out, filtered cold and dried at 50° C.

The new dyestuff, 1,4-di-p-butoxyanilinoanthraquinonedi-sulphonic acid, is a dark green substance.

*Example 8*

1 part of the dyestuff from Example 7 is dissolved in 3000 parts of water containing 1.5 parts of 15% cetyl sodium sulphate paste, 50 parts of well-wetted yarn are entered, the dye-bath is raised to the boil in half an hour and maintained at the boil for 1 hour. The dyed yarn is removed, rinsed in cold water and dried. The wool is dyed in green shades which are very fast to washing, milling and light. The shades are brighter than when no cetyl sodium sulphate is used.

*Example 9*

Leucoquinizarin is interacted with p-isoamyloxyaniline, using similar conditions to those of Example 7. The interaction product is crystallized from pyridine.

The so-obtained 1,4-di-p-isoamyloxyanilinoanthraquinone is a dark blue crystalline substance of melting point 169° C. 20 parts are stirred at 20° C., into 500 parts of chloroform, 50 parts of chlorosulphonic acid are added in 15 minutes at 15–20° C., then 500 parts of chopped ice and the product filtered and washed with weak brine. It is dissolved in 1500 parts of water at 70° C., salted out, cooled and filtered.

The new dyestuff, 1,4-di-p-isoamyloxyanthraquinonedisulphonic acid, dissolves in warm water with a green colour and dyes wool in green shades of very good fastness to severe washing, milling and light.

A green dyestuff having similar properties may be obtained by using p-octyloxyaniline instead of p-isoamyloxyaniline.

*Example 10*

4 parts of leuco-1,4,5-trihydroxyanthraquinone, 20 parts of p-butoxyaniline and 4 parts of boric acid are stirred at 110° C., for 17 hours. The mixture is cooled, diluted with an equal volume of alcohol, and filtered. The residue is washed with alcohol, then with water and dried. If desired the product can be purified by extracting with warm butanol. It is a crystalline product, M. P. 187–9° C., soluble in benzene with a bright yellowish green colour. 3 parts are dissolved in 60 parts of dry chloroform and stirred for a few minutes at 30° C. with 5 parts of chlorosulphonic acid, ice added, and filtered. The filter-cake is dissolved in hot water, neutralized with caustic soda and the dyestuff precipitated with salt.

The new dyestuff 1-hydroxy-5,8-di-p-butoxyanilinoanthraquinonedisulphonic acid is a green substance, which dissolves in water with a yellowish-green colour, and dyes wool in yellowish-green shades, very fast to severe washing, milling and light.

Similar dyestuffs are obtained when p-isoamyloxyaniline or p-heptyloxyaniline is used in place of p-butoxyaniline.

*Example 11*

10 parts of 1,4,5,8-tetrachloroanthraquinone, 70 parts of p-butoxyaniline, 8 parts of potassium acetate and 0.2 part of copper acetate crystals are heated together at 150–155° C. for 16 hours. 70 parts of alcohol are added and the mixture cooled and the product allowed to crystallize. It is filtered, washed with alcohol and dried.

It is sulphonated in chloroform as in Example 9. The dyestuff dissolves in warm water with a green colour, and dyes wool in yellowish-green shades which are very fast to severe washing and milling.

In the examples the alkyl and alkoxyl groups carried by the arylamine are butyl, isoamyl, heptyl, butoxy, isoamyloxy and p-heptyloxy. Arylamines carrying other alkyl or alkoxyl groups within the specified range may equally be used, e. g. 4-isobutylaniline, 4-tert.-butylaniline, 4-hexylaniline, 2-chloro-4-n-butylaniline, 4-propyloxyaniline, 4-propyloxy-3-aminotoluene, 4-hexyloxy-2-aminotoluene, 4-octyloxyaniline, 3-chloro-6-butoxyaniline, 2-isoamyloxyaniline-5-sulphonic acid, and the like. Compounds in which the alkyl or alkoxyl group is para to the amino group are often the most easily accessible, but ortho and meta compounds may also be used.

The anthraquinone nucleus may carry substituents such as hydroxyl, amino, halogen and sulpho groups. Where the anthraquinone nucleus carries a β-halogen substituent, the halogen may be replaced, after the condensation with the arylamine, by a sulpho group by interaction with a soluble sulphite.

As many apparently widely different embodiments of this invention may be made without departing from the spirit and scope thereof, it is to be understood that we do not limit ourselves to the specific embodiments thereof except as defined in the appended claims.

We claim:

1. The process for the manufacture of new acid dyestuffs which comprises condensing an anthraquinone compound which carries in the 1-position a radical of the group consisting of OH and halogen and which carries in the 4-position a substituent of the class consisting of OH, halogen and arylamine radicals of the benzene series, with an arylamine of the benzene series carrying a radical of the group consisting of alkyl radicals containing not less than 4 and not more than 7 carbon atoms and alkoxy radicals containing not less than 3 and not more than 9 carbon atoms, which in both cases are linked directly to the benzene nucleus, sufficient sulfonic acid groups being introduced into the molecule to confer water solubility to the product.

2. Process as claimed in claim 1 in which the anthraquinone body before condensation is reduced at least in part to the corresponding leuco compound.

3. Process for the manufacture of new acid dyestuffs which comprises condensing a 1,4 dihalogenoanthraquinone with an arylamine of the benzene series carrying a radical of the group consisting of an alkyl group of not less than 4 and not more than 7 carbon atoms directly linked to the nucleus, and an alkyl group of not less than 3 and not more than 9 carbon atoms linked to the nucleus through an oxygen atom, a sufficiency of sulphonic acid groups being introduced into the molecule to confer water solubility to the product.

4. Process for the manufacture of new acid dyestuffs which comprises condensing a leucoquinizarin body with an arylamine of the benzene series carrying a radical of the group consisting of an alkyl group of not less than 4 and not more than 7 carbon atoms directly linked to the nucleus, and an alkyl group of not less than 3 and not more than 9 carbon atoms linked to the nucleus through an oxygen atom, a sufficiency of sulphonic acid groups being introduced into the molecule to confer water solubility to the product.

5. Process for the manufacture of new acid dyestuffs which comprises condensing a 1-hydroxy-4-arylaminoanthraquinone with an arylamine of the benzene series carrying a radical of the group consisting of an alkyl group of not less than 4 and not more than 7 carbon atoms directly linked to the nucleus, and an alkyl group of not less than 3 and not more than 9 carbon atoms linked to the nucleus through an oxygen atom, a sufficiency of sulphonic acid groups being introduced into the molecule to confer water solubility to the product.

6. Process as claimed in claim 5 in which the 1-hydroxy-4-arylaminoanthraquinone is applied in part at least in the form of its leuco-compound.

7. Process for the manufacture of new acid dyestuffs which comprises condensing an anthraquinone body having the formula:

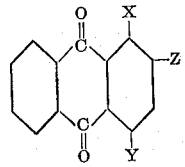

in which X stands for a radical of the class consisting of OH and halogen and Y stands for a radical of the class consisting of OH, halogen and an arylamine group of the benzene series, and Z is halogen, with an arylamine of the benzene series carrying a radical of the group consisting of an alkyl group of not less than 4 and not more than 7 carbon atoms directly linked to the nucleus, and an alkyl group of not less than 3 and not more than 9 carbon atoms linked to the nucleus through an oxygen atom, and thereafter replacing the halogen atom by a sulphonic group by interaction with a soluble sulphite.

8. Process for the manufacture of new acid dyestuffs which comprises condensing an anthraquinone body having the formula

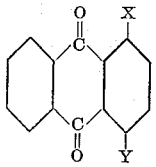

in which X stands for a radical of the class consisting of OH and halogen and Y stands for a radical of the class consisting of OH, halogen and an arylamine group of the benzene series, with an arylamine of the benzene series carrying a radical of the group consisting of an alkyl group of not less than 4 and not more than 7 carbon atoms directly linked to the nucleus, and an alkyl group of not less than 3 and not more than 9 carbon atoms linked to the nucleus through an oxygen atom, and sulphonating the product.

9. Process as claimed in claim 7 in which the anthraquinone body is applied in part at least in the form of its leuco compound.

10. Process as claimed in claim 8 in which the anthraquinone body is applied in part at least in the form of its leuco compound.

11. New acid dyestuffs of the anthraquinone series having the formula

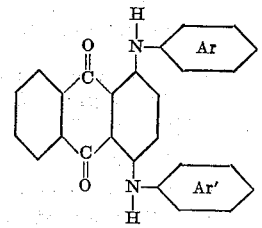

and carrying also at least one sulphonic acid group as nuclear substituent, the benzene residues Ar and Ar' being characterized in that at least one of them carries a nuclear substituent of the class consisting of an alkyl group having not less than 4 and not more than 7 carbon atoms and an alkoxyl group having not less than 3 and not more than 9 carbon atoms.

12. The new acid dyestuff being a sulphonated 1,4-di-(p-butylanilino) anthraquinone.

13. The new acid dyestuff being a sulphonated 1-hydroxy-5,8-di-(p-butylanilino) anthraquinone.

14. The new acid dyestuff being a sulphonated 1,4-di-(p-isoamyloxyanilino) anthraquinone.

15. The new acid dyestuff being a sulphonated 1,4-di-(p-alkylanilino) anthraquinone in which the alkyl group has not less than 4 and not more than 7 carbon atoms.

16. The new acid dyestuff being a sulphonated 1,4-di-(p-alkoxyanilino) anthraquinone in which the alkoxy group has not less than 3 and not more than 9 carbon atoms.

NORMAN HULTON HADDOCK.
FRANK LODGE.
COLIN HENRY LUMSDEN.